United States Patent [19]

Trapp

[11] Patent Number: 4,700,826
[45] Date of Patent: Oct. 20, 1987

[54] DEVICE FOR CONVEYING HEAPS OF DEBRIS

[75] Inventor: Helmut Trapp, Stainach, Austria

[73] Assignee: Voest-Alpine Aktiengesellschaft, Linz, Austria

[21] Appl. No.: 905,265

[22] Filed: Sep. 9, 1986

[30] Foreign Application Priority Data

Sep. 12, 1985 [AT] Austria .................................. 2673/85

[51] Int. Cl.$^4$ .............................................. B65G 65/34
[52] U.S. Cl. ................................ 198/550.12; 198/636
[58] Field of Search .................... 198/550.12, 453, 416, 198/633, 636

[56] References Cited

U.S. PATENT DOCUMENTS

| 3,292,766 | 12/1966 | Leibelt | 198/416 X |
| 3,651,923 | 3/1972 | Anderson et al. | 198/550.12 |
| 3,967,716 | 7/1976 | Smith | 198/416 |

FOREIGN PATENT DOCUMENTS

| 3005038A1 | 8/1981 | Fed. Rep. of Germany . |
| 1570522 | 7/1980 | United Kingdom . |

Primary Examiner—Robert J. Spar
Assistant Examiner—D. Glenn Dayoan
Attorney, Agent, or Firm—Cushman, Darby & Cushman

[57] ABSTRACT

In a device for conveying heaps of debris resulting when mining minerals or for conveying other lumpy material by means of a chain conveyor (1), belt conveyor or the like, in which device the conveyor is passed through a channel (5) having a width approximately corresponding to the width of the conveyor (1) and is guided before the channel (5), as seen in conveying direction (a), between inclined walls (7, 8) laterally extending beyond the width of the conveyor (1) and in which device there are arranged inclined deflection walls before the ingress location (6) into the channel, there exists the risk that blocks having too great a longitudinal size become jammed within the channel (5). For avoiding this risk, there is arranged an obliquely ascending deflection wall (11) in transverse direction relative to the conveying direction (a), said deflection wall including, as seen in a vertical plane extending in parallel relation to the conveying direction (a), with the plane of the conveyor (1) an angle ($\alpha$), being open in opposite direction to the conveying direction (a), of more than 90° and adjoining to an approximately vertical wall (13) extending in parallel relation to the conveying direction and passing over into the channel (5). By this transversely extending deflection wall (11), blocks having an excessive length and extending in transverse direction are lifted and thrown onto the conveyor (1) in longitudinal direction.

9 Claims, 5 Drawing Figures

DEVICE FOR CONVEYING HEAPS OF DEBRIS

BACKGROUND OF THE INVENTION

Field of the Invention

The invention refers to a device for conveying lumpy material, in particular a heap of debris resulting when mining minerals, by means of a chain conveyor, belt conveyor or the like, noting that the conveyor is passed through a channel having a width approximately corresponding to the width of the conveyor and is guided before the channel, as seen in conveying direction, between inclined walls laterally extending beyond the width of the conveyor and noting that before the ingress location into the channel there are arranged inclined deflection walls. The material to be transported is now shifted by the inclined deflection walls in direction to the conveyor and can thus be transported through the channel having a width approximately corresponding to the width of the conveyor. However, blocks having a length exceeding the width of the conveyor are frequently present in the heap of debris. If the longitudinal extension of such elongated blocks approximately coincides with the conveying direction, these blocks become oriented by the deflection walls tapering like a funnel such that they can be conveyed through the channel. If, however, such elongated blocks extend in transverse direction to the conveying direction and laterally extend beyond the width of the conveyor, jamming and blocking may occur when entering the channel, so that operation becomes disturbed. If such jamming occurs within the channel, such jamming can only be remedied with extreme difficulties.

SUMMARY OF THE INVENTION

It is an object of the invention to avoid any thwarting of elongated blocks when conveying the heap of debris through a constricted passage formed of the channel. For solving this task, the invention essentially consists in that at one side of the conveyor there is arranged an obliquely ascending deflection wall in transverse direction to the conveying direction, said deflection wall including, as seen in a vertical section extending in parallel relation to the conveying direction, with the plane of the conveyor an angle, being open in opposite direction to the conveying direction, of more than 90° and having adjoined thereto an approximately vertical wall extending in parallel relation to the conveying direction and passing over into the channel. Blocks, whose dimension in transverse direction to the conveying direction is too great, run up the inclined deflection wall transversely extending relative to the conveying direction and become oriented in longitudinal direction of the conveyor, so that these blocks can not assume a transverse position and blocking or jamming within the channel is avoided. Such blocks run up the transversely extending deflection wall and fall with its longitudinal dimension into the longitudinal direction of the conveyor. On account of this inclined deflection wall, which is arranged in transverse direction to the conveying direction, adjoining an approximately vertical wall extending in parallel relation to the conveying direction and itself passing over into the channel, orienting of the block in longitudinal direction of the conveyor is already effected in front of the ingress location into the channel, so that no difficulties arise when the blocks enter the channel. Such a channel can be a channel being laterally closed and closed on top but can also be a channel which is only delimited by side walls and is open on top. When using the device for heaps of debris, this channel can be that portion of the conveyor plant which is passed below the revolving turret of a partial cut cutting machine, but such a channel can, for example, also be passed below a crusher roll. On account of the wall, which extends in transverse direction to the conveying direction, being arranged only at one side of the conveyor, such an elongated thwarted block is lifted only at one side by the transversely extending deflection wall and is thus thrown onto the conveyor in a longitudinal oriented position. Thus, the theoretic condition is avoided that a block is lifted at both sides by such a transversely extending inclined deflection wall and is then not aligned in longitudinal direction.

According to the invention, the arrangement is preferably such that the deflection wall transversely extending to the conveying direction includes, as seen in a vertical section parallely extending relative to the conveying direction, with the plane of the conveyor an angle, being open in opposite direction to the conveying direction, of 120° to 150°.

According to the invention, the inclined wall extending beyond the width of the conveyor and arranged at the other side of the conveyor is conveniently tapering like a funnel in direction to the ingress location into the channel. In this manner, the block is guided into the channel in its position aligned with the longitudinal direction of the conveyor.

If the deflection wall transversely extending to the conveying direction includes, as seen in a horizontal section, an angle of 90° with the conveying direction and is thus not transversely inclined relative to the conveyor, its task to lift the block and to drop the block in aligned position is also fulfilled. However, there exists the possibility that such an elongated block is lifted for too a great extent and then falls onto the conveyor with a great inertia force. In case of a heavy block, there results the danger of damaging the conveyor. Therefore and according to a preferred embodiment of the invention, the deflection wall transversely extending relative to the conveying direction includes, as seen in a horizontal section, an angle, being open in opposite direction to the conveying direction, of less than 90° with the conveying direction. This transverse inclination results in the effect that the block slides, already prior to being lifted too much, onto the conveyor and thus hits the conveyor with a reduced inertia force. If this transverse inclination is selected too great, the block running up is no more lifted but slides directly to the conveyor, so that alignment in longitudinal direction becomes again more difficult. For this reason and according to the invention, the deflection wall transversely extending relative to the conveying direction preferably includes, as seen in a horizontal section, an angle, being open in opposite direction to the conveying direction, of at least 60° with the conveying direction.

According to the invention, the arrangement is conveniently such that the deflection wall transversely extending relative to the conveying direction tapers in downward direction and this preferably according to the shape of a triangle. In this manner a transition area is provided in direction to the inclined limiting walls of the chute or the like, which limiting walls are arranged before the location of ingress into the channel. Furthermore, the arrangement is, according to the invention, conveniently such that the height of the approximately vertical wall extending in parallel relation to the conveying direction is reduced, preferably according to the shape of a triangle, in opposite direction to the conveying direction. This vertically arranged wall adjoins the side wall of the channel at the front side as seen in conveying direction. This vertically arranged wall adjoins the conveyor at the bottom area, and the hypotenuse of the triangle adjoins the deflection wall transversely extending relative to the conveying direction, so that there results a well suitable area of transition between the deflection wall extending transversely to the conveying direction and the vertical wall. According to the invention, the deflection wall transversely extending to the conveying direction conveniently passes over, in this case, into the approximately vertical wall extending in parallel relation to the conveying direction via a straight intersection edge. This provides the possibility to do with plane wall surfaces, and such plane wall surfaces can most easily be manufactured.

BRIEF DESCRIPTION OF THE DRAWING

In the drawing, the invention is schematically illustrated by an embodiment. In the drawing

DETAILED DESCRIPTION OF THE PREFERRED EMBODIMENT

Figure 1:
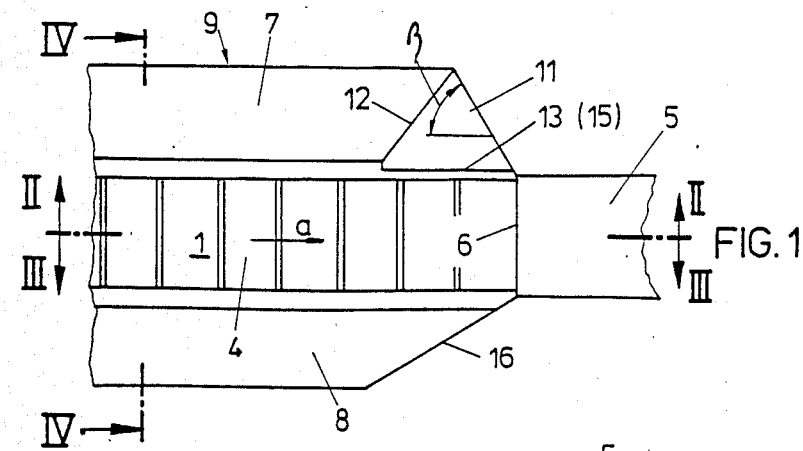
FIG. 1 shows a top plan view of the device according to the invention.

In the drawing, reference numeral 1 represents the conveyor which is, in the embodiment according to the drawing, designed as a chain conveyor, in which two endless chains 2 act on transverse rods 3, which are guided over armor plates 4 and are pulled by the chains 2. The returning strands of the chains 2 run, together with the transverse rod 3, below the armor plates 4 but are not shown. The conveyor is passed through a channel 5 being closed at its sides and on top. Before the ingress location 6 into this channel 5, the conveyor 1 is limited by inclined side walls 7 and 8. That area of the conveyor, which is limited by the side walls 7 and 8, is, for example, a receiving chute or a receiving hopper 9. Reference numerals 10 indicate inclined cover sheets covering the chains 2.

A deflection wall 11 extending transversely relative the the conveying direction a adjoins the side wall 7 via an intersection edge 12. Reference numeral 13 indicates a vertically arranged wall passing over into the vertically arranged side wall 14 of the channel 5. The deflection wall 11 extending transversely relative to the conveying direction passes over into the vertically arranged wall 13 via a straight intersection edge 15. This inclined deflection wall 11 transversely extending relative to the conveying direction a is only provided at the side of the inclined wall 7. At the oppositely located side of the conveyor 1, the inclined limiting wall 8 passes over into the channel 5 via a funnel-shaped constriction 16. The inclined deflection wall 11 transversely extending relative to the conveying direction has, as is clearly shown in FIG. 2, also a transverse inclination.

Figure 2:
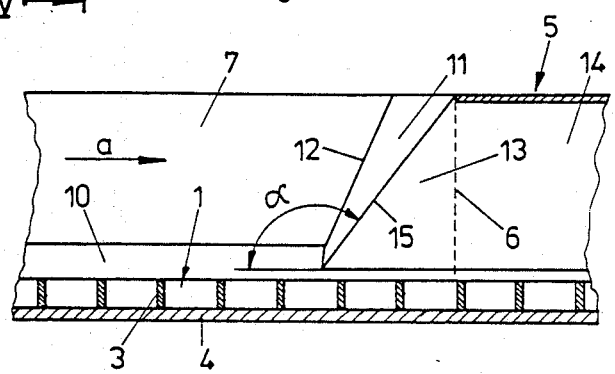
FIG. 2 shows a section through the device along line II—II of FIG. 1.
Figure 3:
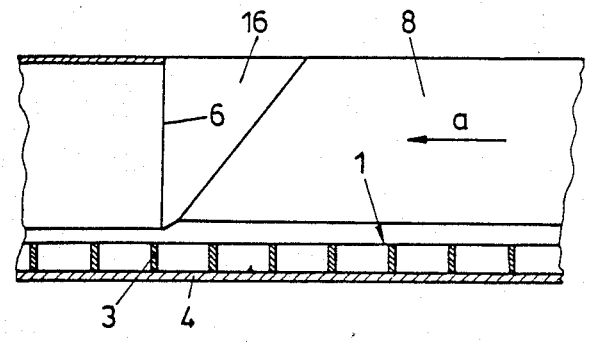
FIG. 3 shows a section along line III—III of FIG. 1.
Figure 4:
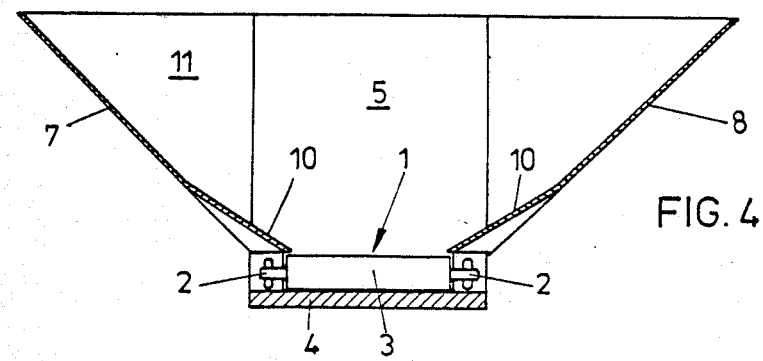
FIG. 4 shows a section along line IV—IV of FIG. 1
Figure 5:
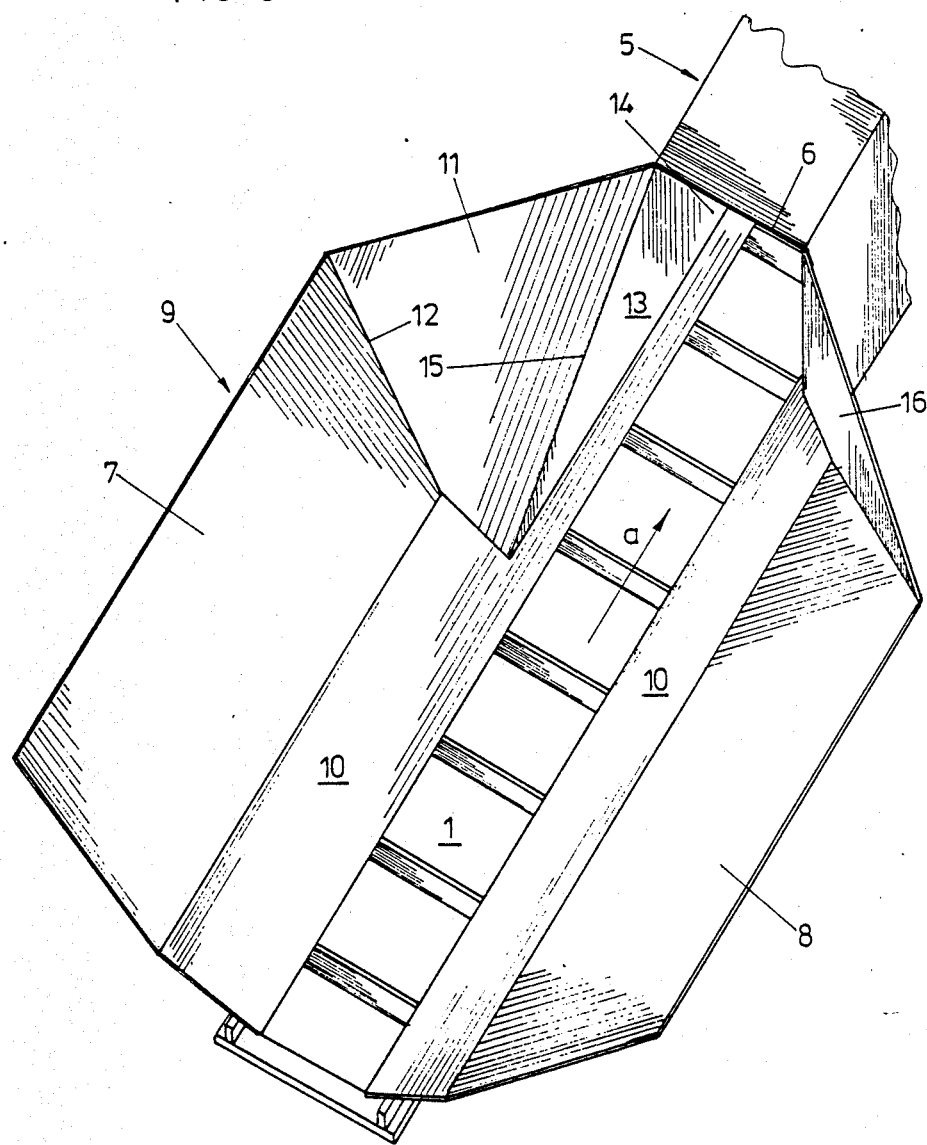
FIG. 5 shows a perspective view.

As can be taken from FIG. 2, which shows a vertical section extending in parallel relation to the conveying direction a, the deflection wall 11 transversely extending relative to the conveying direction includes an angle $\alpha$, being open in opposite direction to the conveying direction a, of more than 90°, i.e. of approximately 120° to 150°, with the plane of the conveyor 1. As can be taken from FIG. 1, which shows a top plan view and thus also a horizontal section, the deflection wall 11 transversely extending relative to the conveying direction includes an angle $\beta$, being open in opposite direction to the conveying direction a, of less than 90°, i.e. of approximately 60°, with the conveying direction a.

Within the area of the channel 5 there can, for example, be arranged a crusher.

What is claimed is:

1. Device for conveying lumpy material, in particular a heap of debris resulting when mining minerals, by means of a chain conveyor, belt conveyor or the like, noting that the conveyor is passed through a channel having a width approximately corresponding to the width of the conveyor and is guided before the channel, as seen in conveying direction, between inclined walls laterally extending beyond the width of the conveyor and noting that before the ingress location into the channel there are arranged inclined deflection walls, characterized in that at one side of the conveyor there is arranged an obliquely ascending deflection wall (11) in transverse direction to the conveying direction (a), said deflection wall including, as seen in a vertical section extending in parallel relation to the conveying direction (a), with the plane of the conveyor (1) an angle ($\alpha$), being open in opposite direction to the conveying direction (a), of more than 90° and having adjoined thereto an approximately vertical wall (13) extending in parallel relation to the conveying direction (a) and passing over into the channel (5).

2. Device as claimed in claim 1, characterized in that the deflection wall (11) transversely extending to the conveying direction includes, as seen in a horizontal section, an angle ($\beta$), being open in opposite direction to the conveying direction (a), of less than 90° with the conveying direction (a).

3. Device as claimed in claim 1, characterized in that, at the other side of the conveyor (1), the width of the inclined wall (8) extending beyond the width of the conveyor (1) is reduced like a funnel in direction to the ingress location (6) in the channel (5).

4. Device as claimed in claim 1 characterized in that the width of the deflection wall (11) transversely extending relative to the conveying direction (a) tapers in downward direction and this preferably according to the shape of a triangle.

5. Device as claimed in claim 1, characterized in that the height dimension of the approximately vertical wall (13) extending in parallel relation to the conveying direction (a) is reduced in opposite direction to the conveying direction (a) and this preferably according to the shape of a triangle.

6. Device as claimed in claim 1, characterized in that the deflection wall (11) transversely extending relative to the conveying direction passes over into the approximately vertical wall (13) extending in parallel relation to the conveying direction (a) via a straight intersection edge (15).

7. Device as claimed in claim 1, characterized in that the deflection wall (11) transversely extending relative to the conveying direction (a) includes, as seen in a vertical section parallelly extending to the conveying direction (a), an angle ($\alpha$), being open in opposite direction to the conveying direction (a), of 120° to 150° with the plane of the conveyor (1).

8. Device as claimed in claim 1, characterized in that the deflection wall (11) transversely extending relative to the conveying direction (a) includes an angle (β), being open in opposite direction to the conveying direction (a), of at least 60° with the conveying direction (a).

9. Device as claimed in claim 1, characterized by being arranged before a channel (5) being closed at its sides and on top.

* * * * *